US010706734B2

(12) United States Patent
Gawlick et al.

(10) Patent No.: US 10,706,734 B2
(45) Date of Patent: Jul. 7, 2020

(54) METHODS FOR IMPROVING TEST EFFICIENCY AND ACCURACY IN A COMPUTER ADAPTIVE TEST (CAT)

(71) Applicant: ACT, INC., Iowa City, IA (US)

(72) Inventors: Lisa Gawlick, Iowa City, IA (US); Changhui Zhang, Coralville, IA (US); Nancy Petersen, Solon, IA (US); Lingyun Gao, Coralville, IA (US)

(73) Assignee: ACT, INC., Iowa City, IA (US)

( * ) Notice: Subject to any disclaimer, the term of this patent is extended or adjusted under 35 U.S.C. 154(b) by 1266 days.

(21) Appl. No.: 14/562,167

(22) Filed: Dec. 5, 2014

(65) Prior Publication Data

US 2015/0161899 A1 Jun. 11, 2015

Related U.S. Application Data

(60) Provisional application No. 61/912,774, filed on Dec. 6, 2013.

(51) Int. Cl.
*G09B 7/00* (2006.01)

(52) U.S. Cl.
CPC ..................... *G09B 7/00* (2013.01)

(58) Field of Classification Search
CPC ....................................... G09B 7/02
USPC .......................................... 434/350
See application file for complete search history.

(56) References Cited

U.S. PATENT DOCUMENTS

| | | | |
|---|---|---|---|
| 5,059,127 A | 10/1991 | Lewis et al. | |
| 5,565,316 A | 10/1996 | Kershaw et al. | |
| 5,657,256 A | 8/1997 | Swanson et al. | |
| 5,827,070 A | 10/1998 | Kershaw et al. | |
| 5,841,655 A | 11/1998 | Stocking et al. | |
| 6,000,945 A | 12/1999 | Sanchez-Lazer et al. | |
| 6,118,973 A | 9/2000 | Ho et al. | |
| 6,120,299 A | 9/2000 | Trenholm et al. | |
| 6,418,298 B1 | 7/2002 | Sonnenfeld | |
| 6,431,875 B1 | 8/2002 | Elliott et al. | |
| 6,606,479 B2 | 8/2003 | Cook et al. | |
| 6,652,283 B1 | 11/2003 | Van Schaack et al. | |
| 6,688,889 B2 | 2/2004 | Wallace et al. | |
| 6,704,741 B1 | 3/2004 | Lively, Jr. et al. | |
| 8,131,554 B2 | 3/2012 | Higgins | |
| 8,229,343 B2 | 7/2012 | Driscoll et al. | |
| 2002/0160347 A1 | 10/2002 | Wallace et al. | |

(Continued)

OTHER PUBLICATIONS

Han, Kyung T., "Item Pocket Method to Allow Response Review and Change in Computerized Adaptive Testing", Applied Psychological Measurement, (Jun. 2013), vol. 37, No. 4, pp. 259-275.

(Continued)

*Primary Examiner* — Thomas J Hong
(74) *Attorney, Agent, or Firm* — Sheppard, Mullin, Richter & Hampton LLP

(57) ABSTRACT

A method for use of pretest items in a test to calculate interim scores is provided. The method includes, for example, a computer implemented test having a plurality of test items that include, for example, a plurality of operational items and one or more pretest items having one or more pretest item parameters. An interim latent construct estimate is calculated using both operational and pretest items. The error for the latent construct estimation is controlled by weighting the contribution of the one or more pretest items.

12 Claims, 14 Drawing Sheets

(56) References Cited

U.S. PATENT DOCUMENTS

| | | | |
|---|---|---|---|
| 2002/0192629 A1 | 12/2002 | Shafrir | |
| 2003/0138765 A1 | 7/2003 | Bowers | |
| 2004/0091847 A1 | 5/2004 | Creamer | |
| 2004/0202988 A1 | 10/2004 | Evans et al. | |
| 2005/0125196 A1 | 6/2005 | Swanson | |
| 2005/0186551 A1 | 8/2005 | Belov | |
| 2005/0256663 A1* | 11/2005 | Fujimori | G09B 19/06 702/121 |
| 2006/0228686 A1* | 10/2006 | McKinley | G09B 7/00 434/323 |

OTHER PUBLICATIONS

Stocking, M.L., "Revising Item Responses in Computerized Adaptive Tests: A Comparison of Three Models", Applied Psychological Measurement, (Jun. 1997), vol. 21, No. 2 pp. 129-142.

Wise, S.L., "A Critical Analysis of the Arguments For and Against Item Review In Computerized Adaptive Testing" Paper Presented at the Annual Meeting of the National Council on Measurement in Education, New York, (Apr. 1996), pp. 1-25.

Papanastasiou, Elena C. & Mark D. Reckase, "A Rearrangement Procedure For Scoring Adaptive Tests With Review Options", International Journal of Testing, (2007) vol. 7, No. 4, pp. 387-407.

Wainer, H., "Some Practical Considerations When Converting a Linearly Administered Test to an Adaptive Format", Educational Measurement; Issues and Practices, (1993) vol. 12, pp. 15-20.

Robin, Frederic, "A Comparison of Conventional and Bin-Structured Computerized Adaptive Tests", Paper Presented at the annual meeting of the American Educational Research Association, Montreal, Canada, (Apr. 13, 2005).

Davey, Tim, "An Introduction to Bin-Structured Adaptive Testing", Paper Presented at the Annual Meeting of the National Council on Measurement in Education, Montreal, (Apr. 2005).

Jodoin, Michael G., "Developing Bin-Structured Item Pools", Paper Presented at the Annual Meeting of the American Educational Research Association, Montreal, QC, (Apr. 15, 2005).

* cited by examiner

METHODS FOR IMPROVING TEST EFFICIENCY AND ACCURACY IN A COMPUTER ADAPTIVE TEST (CAT)

CROSS-REFERENCE TO RELATED APPLICATIONS

This application claims priority under 35 U.S.C. § 119 to provisional application Ser. No. 61/912,774, filed Dec. 6, 2013, which is hereby incorporated in its entirety.

BACKGROUND OF THE DISCLOSURE

I. Field of the Disclosure

The present disclosure relates to computer adaptive testing. More specifically, but not exclusively, the present disclosure relates to methods for improving test efficiency and accuracy by providing a procedure for extracting information from an examinee's responses to pretest items for use in construct estimation in a Computer Adaptive Test (CAT).

II. Description of the Prior Art

In a Computer Adaptive Test (CAT), pretest items may be imbedded in the test but not intended necessarily to make a contribution to the estimation of the examinee's latent construct. Typically, pretest items are embedded in a CAT but examinee responses to the pretest items are not used in item selection or scoring; generally only examinee responses to operational items are used in item selection or scoring. Thus, the information contained in the examinee's responses to the pretest items is underutilized or even wasted.

Therefore, it is a primary object, feature, or advantage of the present disclosure to use valuable information in the examinee's responses to the pretest items, which may be used together with the information in the examinee's responses to the operational items for construct estimation.

In a CAT, the next item administered to an examinee can be selected based on the examinee's interim ability score which can be estimated using responses to the operational items administered thus far and the interim ability estimate is updated after the administration of each operational item.

Therefore, it is a primary object, feature, or advantage of the present disclosure to improve efficiency and final score estimation for a CAT by providing a more accurate interim ability score, which means a more informative next item can be selected for administration to the examinee.

It is another object, feature, or advantage of the present disclosure to use pretest information to provide improved interim ability score estimation, to fine-tune a test, for example, by making a test shorter or more accurate and thereby more effective.

Still another object, feature, or advantage of the present disclosure provides for using examinee responses to pretest items in interim ability scoring.

The obstacle of counting on pretest items for construct estimation is that the item parameters are not in place when they are administered. Technically, the pretest item parameters could be estimated on the fly (i.e., in real time during test administration) and updated right after being exposed to a new examinee, but the response sample size is smaller than in the standard practice for calibration. Small sample sizes could lead to large error in the estimated item parameters. The uncertainty of the item parameters of pretest items discourages their use in construct calculations.

Therefore, another object, feature, or advantage of the present disclosure uses weighted interim score calculations to control the error impact when including pretest items in construct estimation.

One or more of these and/or other objects, features or advantages of the present disclosure will become apparent from the specification and claims that follow.

SUMMARY OF THE DISCLOSURE

The present disclosure improves test efficiency and accuracy in a CAT.

One exemplary method is for use of pretest items in addition to operational items in a test to calculate interim scores. This may be accomplished, for example, by providing a computer implemented test that includes a plurality of operational items and one or more pretest items having one or more item parameters. Interim latent construct estimates are calculated using both operational and pretest items. Error for the interim latent construct estimates is controlled by weighting the contribution of the pretest items.

According to one aspect, a method for using pretest items to calculate interim scores is provided. The method uses a computer implemented test having a plurality of test items including a plurality of operational items and one or more pretest items having one or more pretest item parameters. In one exemplary operation, latent construct estimates are calculated using both operational and pretest items by estimating one or more pretest item parameters for use with a set of calibrated parameters for the plurality of operational items.

According to one aspect, a method for using pretest items in the calculation of interim scores is provided. The method includes providing a computer implemented test having a plurality of test items. The test items include a plurality of operational items and one or more pretest items having one or more pretest item parameters. Steps of the method include, additionally, for example, calculating latent construct estimates using both operational and pretest items, controlling error for the latent construct estimates by weighting the contributions of the one or more pretest items, estimating the one or more pretest item parameters for use with a set of calibrated parameters for the plurality of operational items, and updating an interim score for the computer implemented test based on examinee responses to the one or more pretest items.

BRIEF DESCRIPTION OF THE DRAWINGS

Illustrated embodiments of the present disclosure are described in detail below with reference to the attached drawing figures, which are incorporated by reference herein, and where.

DETAILED DESCRIPTION OF THE PREFERRED EMBODIMENTS

The present disclosure provides for various computer adaptive testing methods. One exemplary method includes using pretest items in interim latent construct estimation. The accuracy and efficiency of computer adaptive testing is improved by making the test more succinct and/or accurate, and thus more effective. What results is a testing platform using computer adaptive testing that can estimate examinees' ability using examinee's response information relating to a specific set of pretest items.

I. Using Pretest Items to Fine-Tune an Examinee's Interim Score

According to one aspect, the disclosure may be implemented using a computer adaptive testing platform to create a more succinct and/or accurate and thereby shorter and more effective test using examinees responses to pretest items included in the administration of a test.

a. Illustrative Embodiments for Using Pretest Items to Fine-Tune an Examinee's Interim Score In a computer adaptive test (CAT), pretest items are often embedded but not used to estimate an examinee's latent construct. However, examinees' responses to these items can reveal additional information, which can be used to improve score accuracy and test efficiency. Additionally, including pretest items in interim scoring can have benefits such as improving candidate motivation when the items administered are closer to candidate ability.

One of the obstacles to the inclusion of pretest items in scoring is that their parameters are not in place when these items are administered. While research studies have demonstrated that pretest item parameters can be estimated on the fly, the challenge of larger error as a result of smaller sample sizes for the pretest items has posed a big concern and no solutions have been found. Consequently, the uncertainty of the pretest item parameters deters people from using them in scoring.

Understanding the impact of less accurate or indiscriminate item parameters on ability estimation, such as latent construct calculations, and finding a way to control and calibrate such error are examined in the preceding paragraphs and accompanying illustrative works identified in the figures incorporated herein. Increasing the efficiency and effectiveness of computer adaptive testing undoubtedly will result in a significant cost savings, and likely a shorter, more succinct and accurate test thereby increasing the effectiveness of computer administrated testing. Notwithstanding a resultant cost savings, surely the efficiency, effectiveness and accuracy of computer adaptive testing can be significantly improved at least without resulting in an increase in cost. Therefore, a method for using pretest items to fine-tune an examinee's interim score is provided herein. For purposes of illustration, a flowchart diagram is provided in FIG. 1 as one pictorial representation of a method for using pretest items to fine-tune an examinee's interim score or latent construct estimation.

Figure 1:
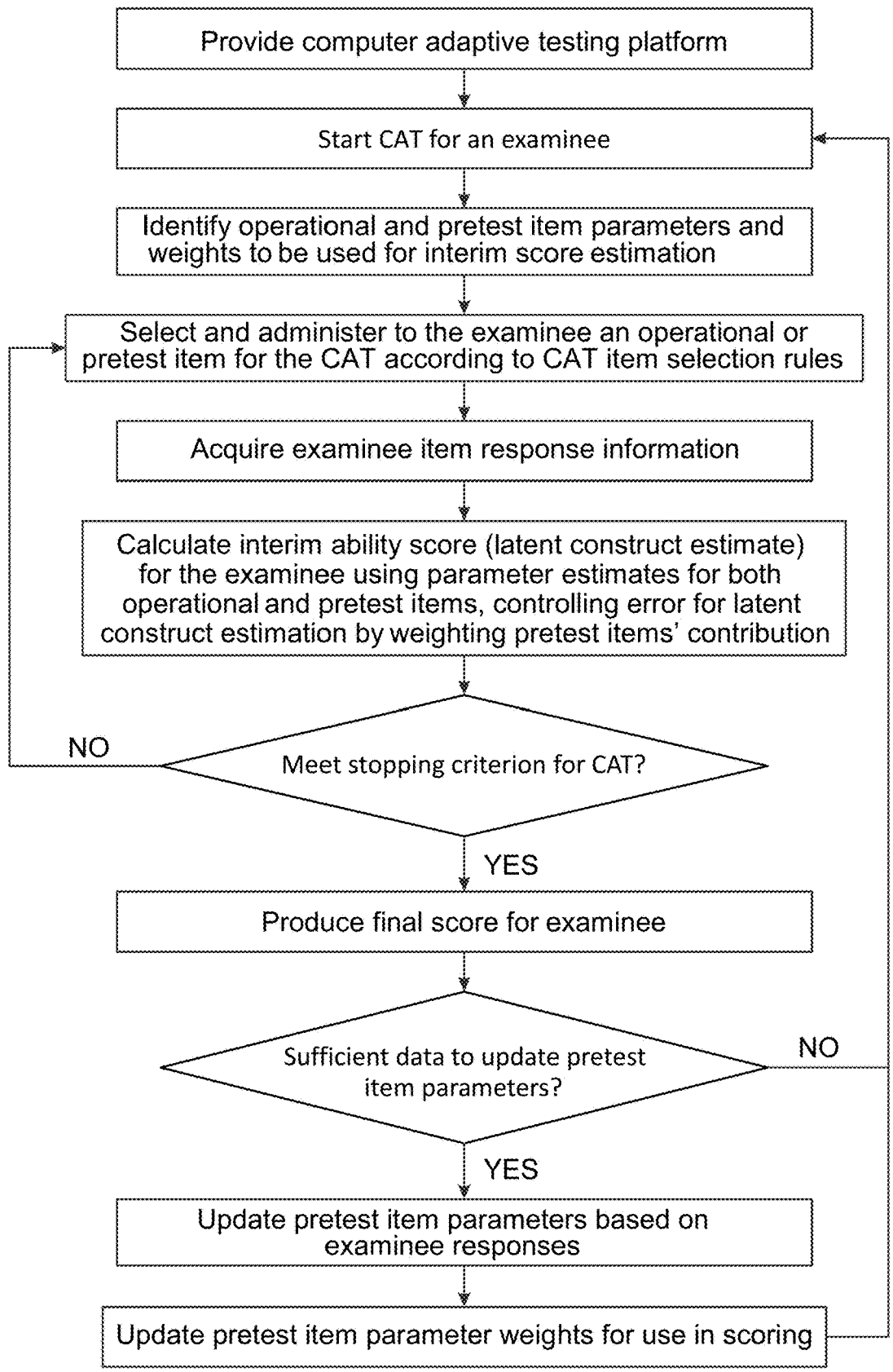
FIG. 1 is a flowchart of a process for using pretest items for latent construct estimation in computer adaptive testing in accordance with an illustrative embodiment.
Figure 2:
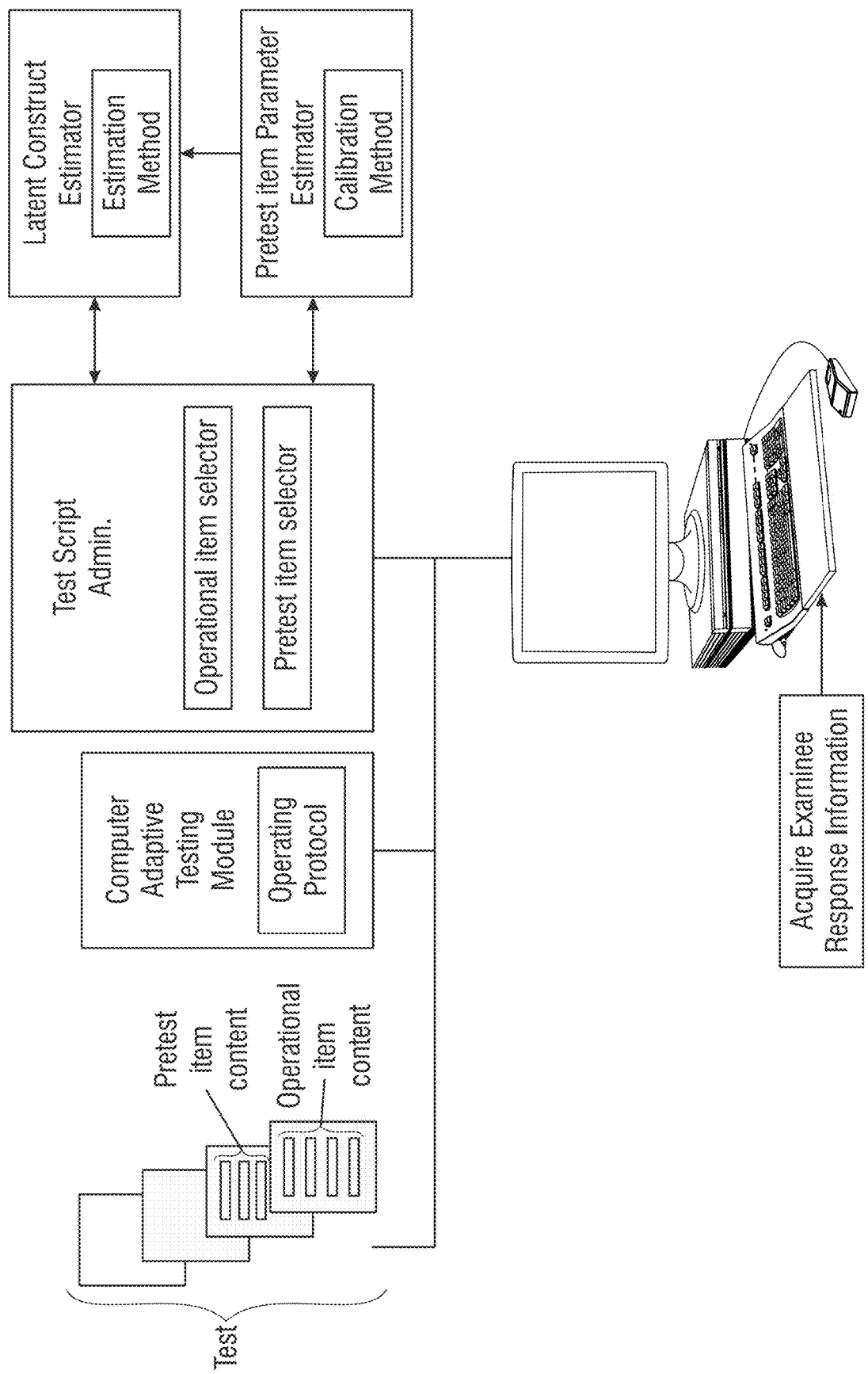
FIG. 2 is a block diagram providing an overview of a process for using pretest items in latent construct estimations in accordance with an illustrative embodiment.
Figure 3A:
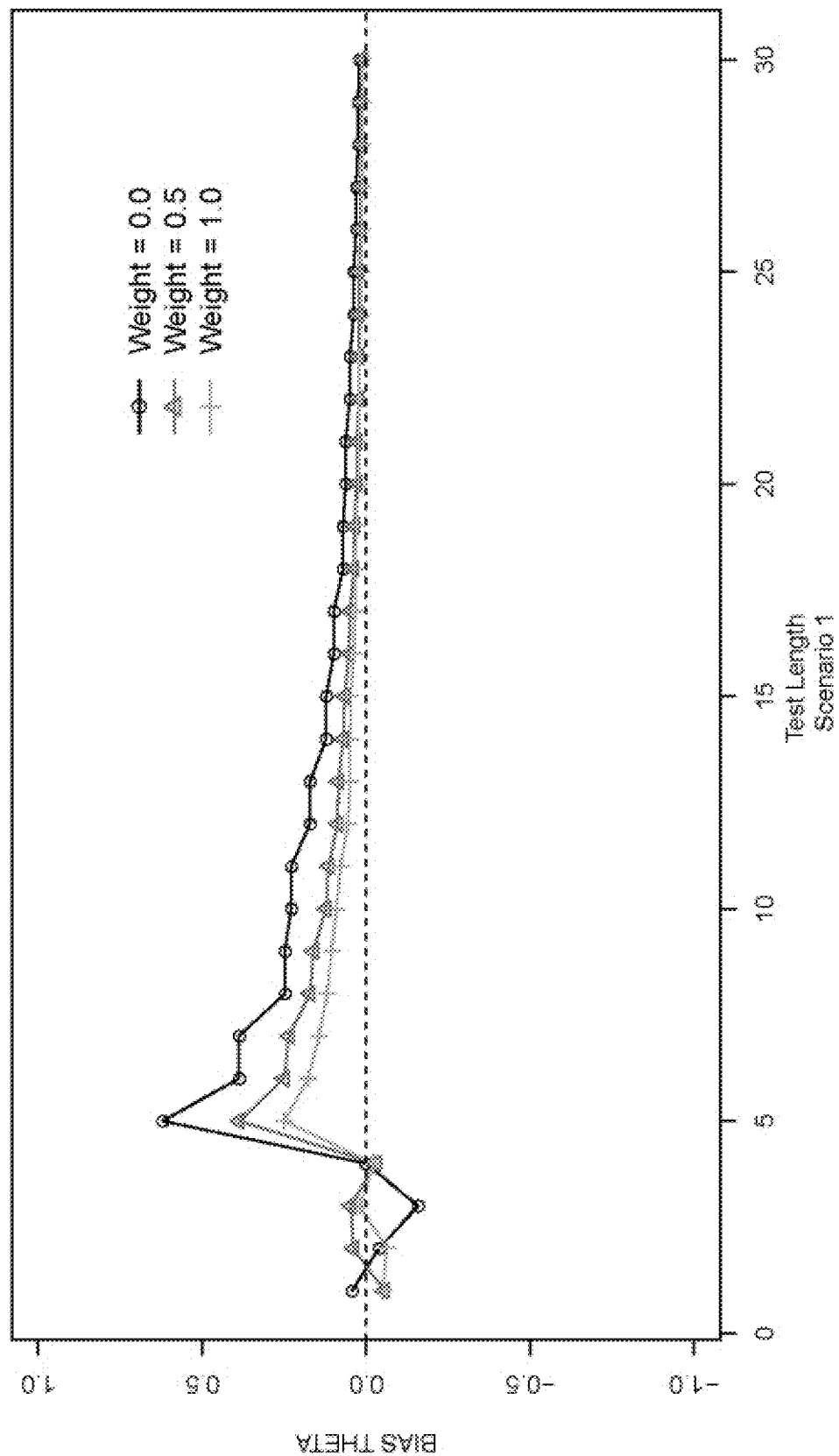
FIGS. 3(A-D) are pictorial representations in plot form for the mean errors (ME) of each simulation in accordance with an illustrative embodiment.
Figure 3B:
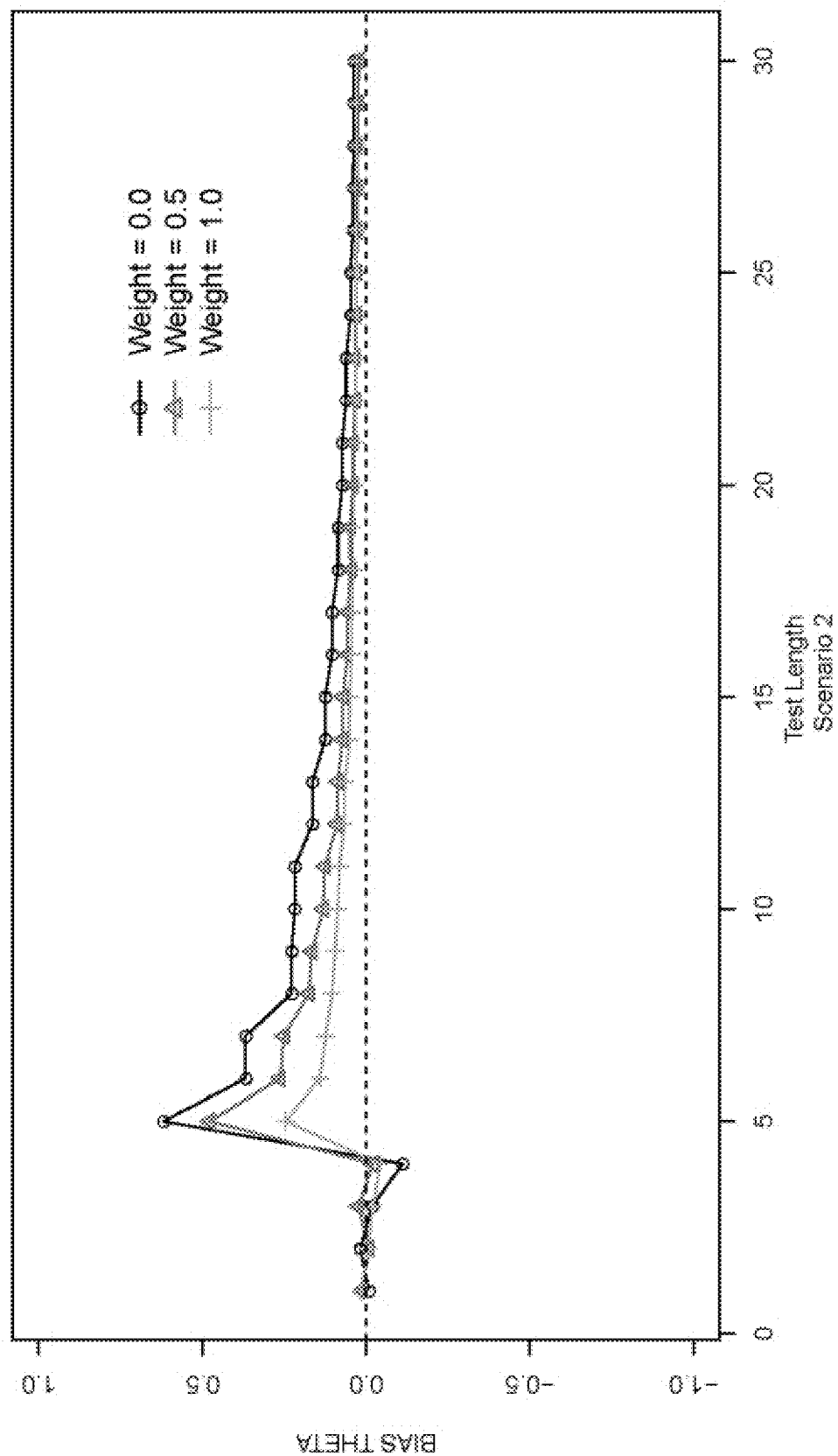
Figure 3C:
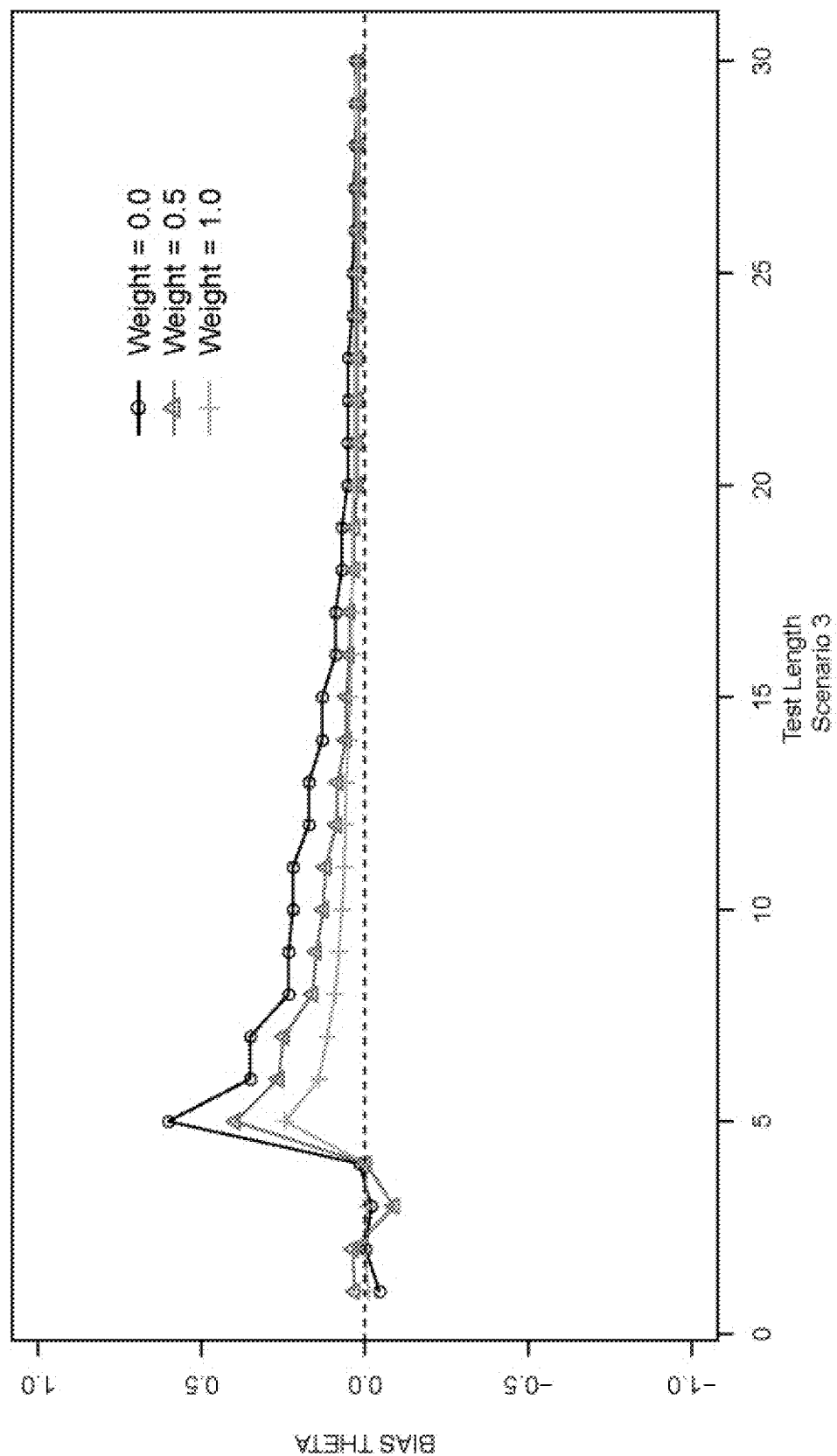
Figure 3D:
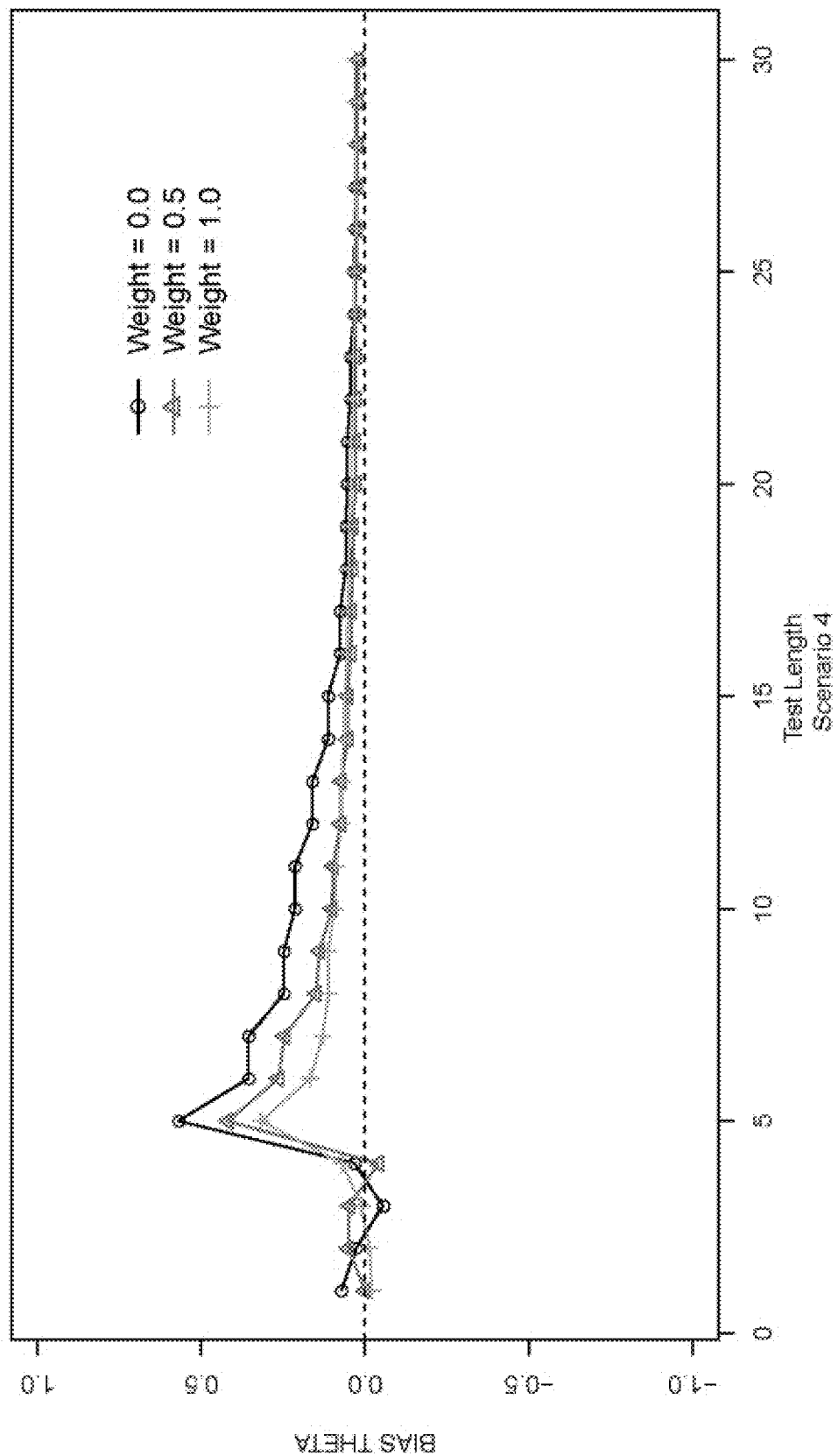
Figure 4A:
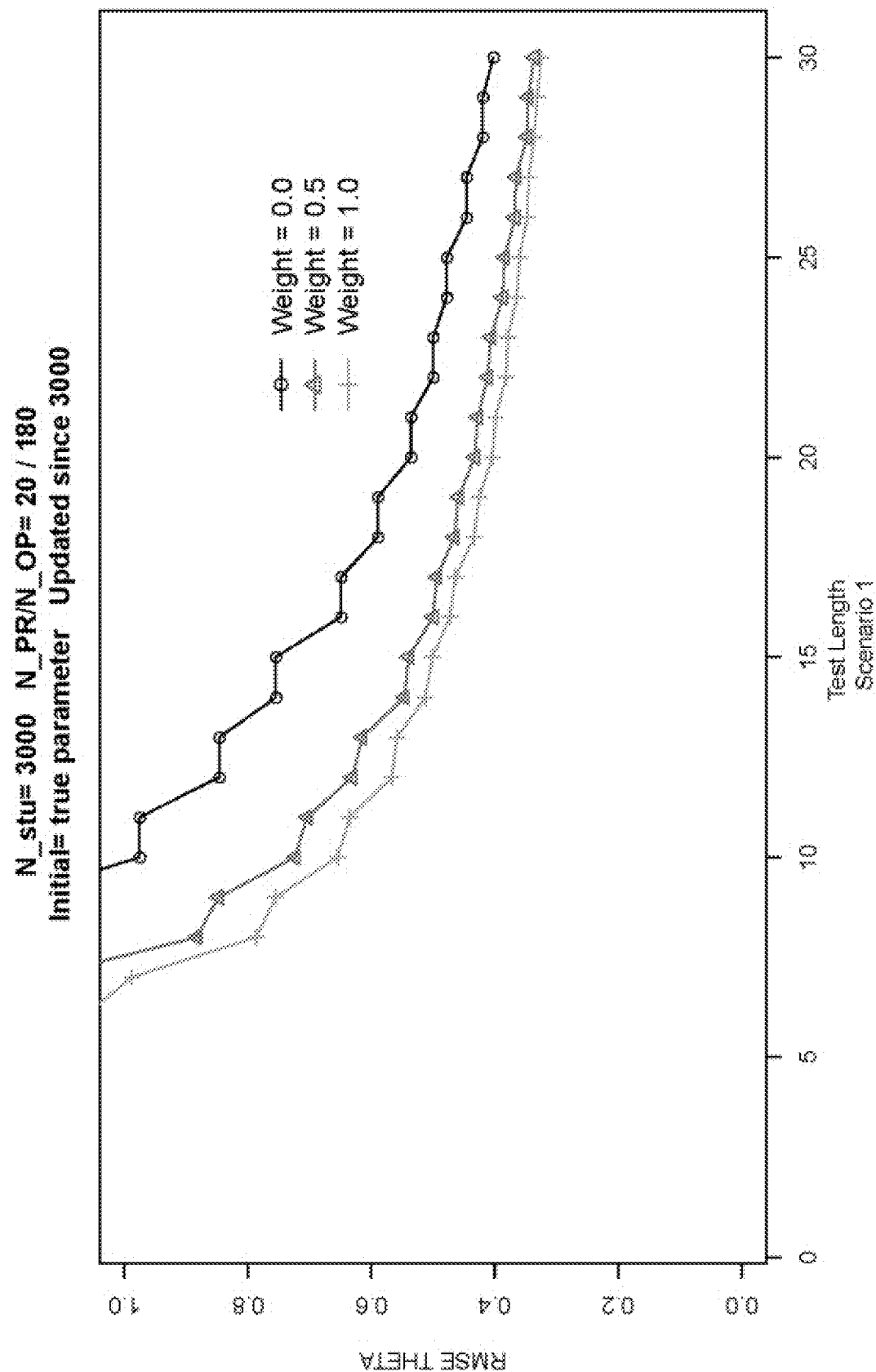
FIGS. 4(A-D) are pictorial representations in plot form for the root mean squared error (RMSE) of each simulation in accordance with an illustrative embodiment.
Figure 4B:
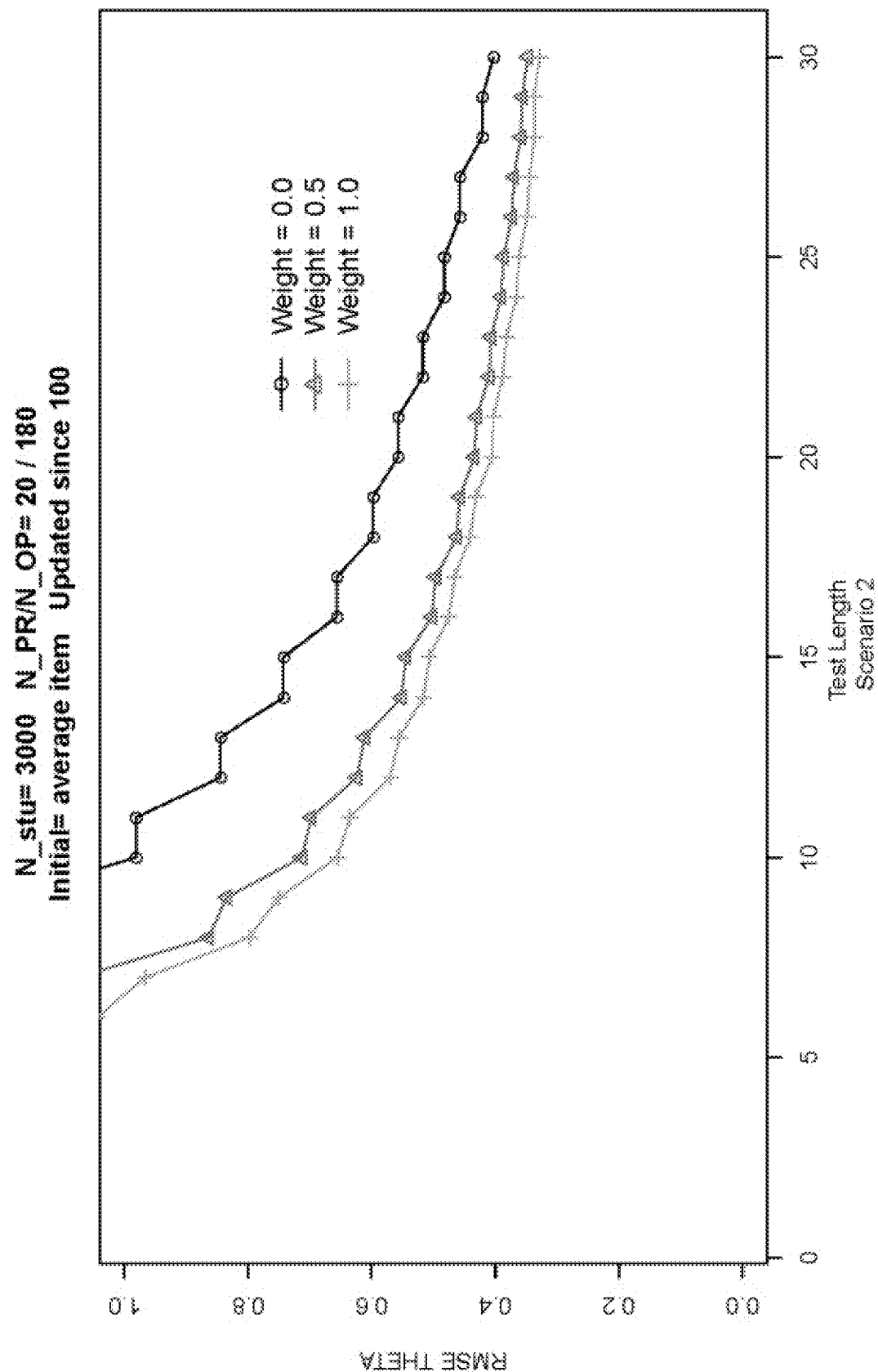
Figure 4C:
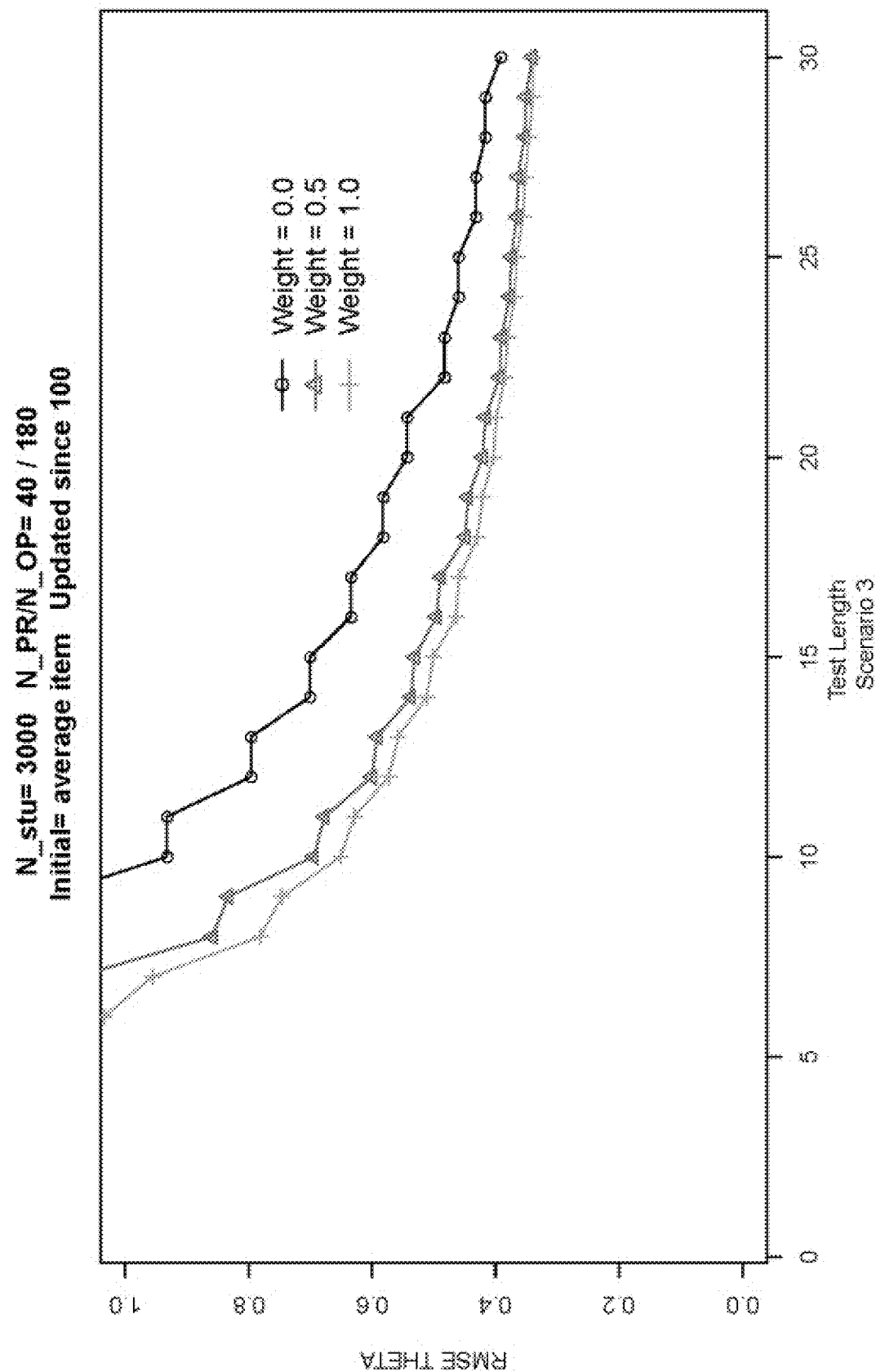
Figure 4D:
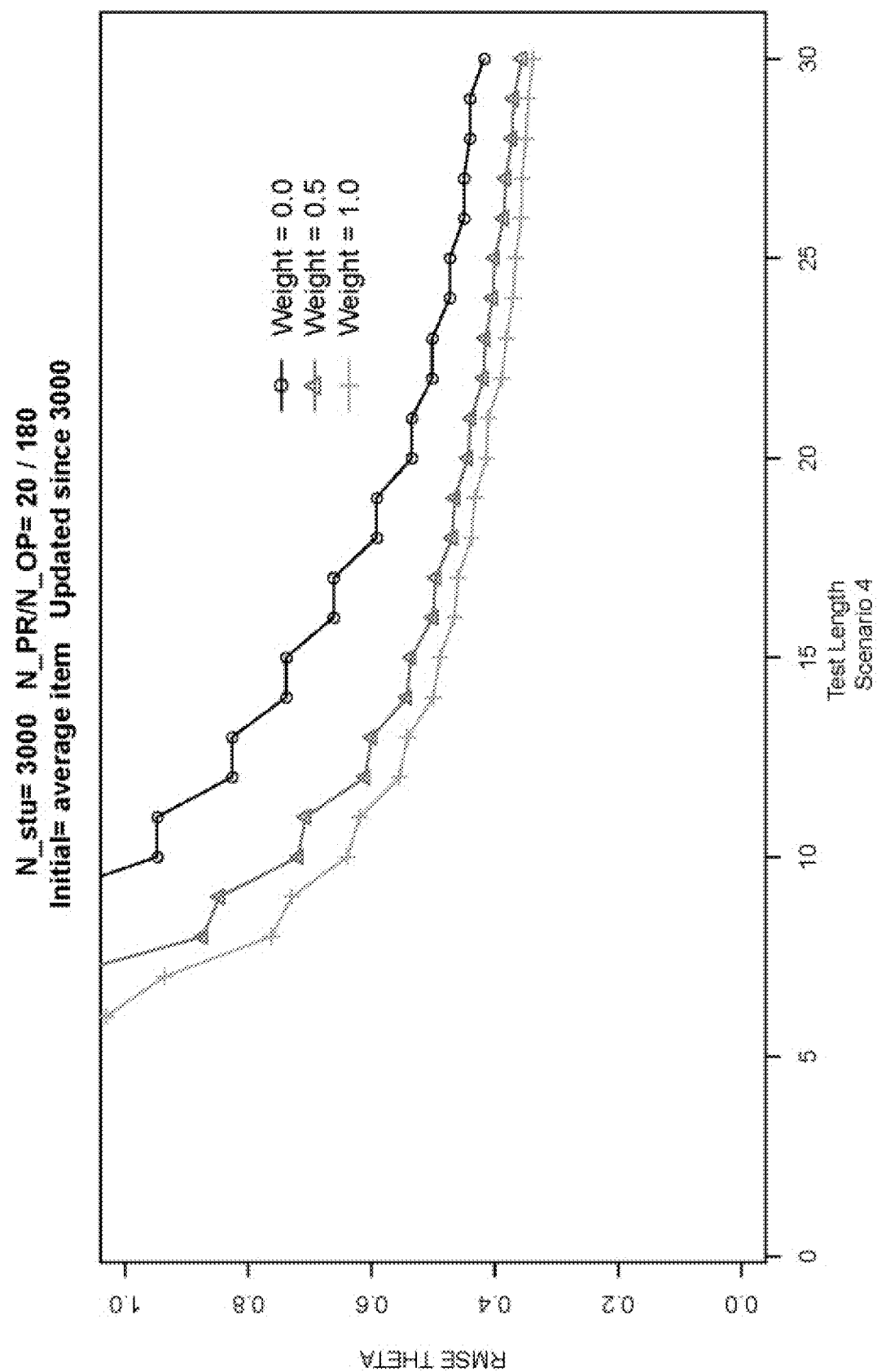
Figure 5A:
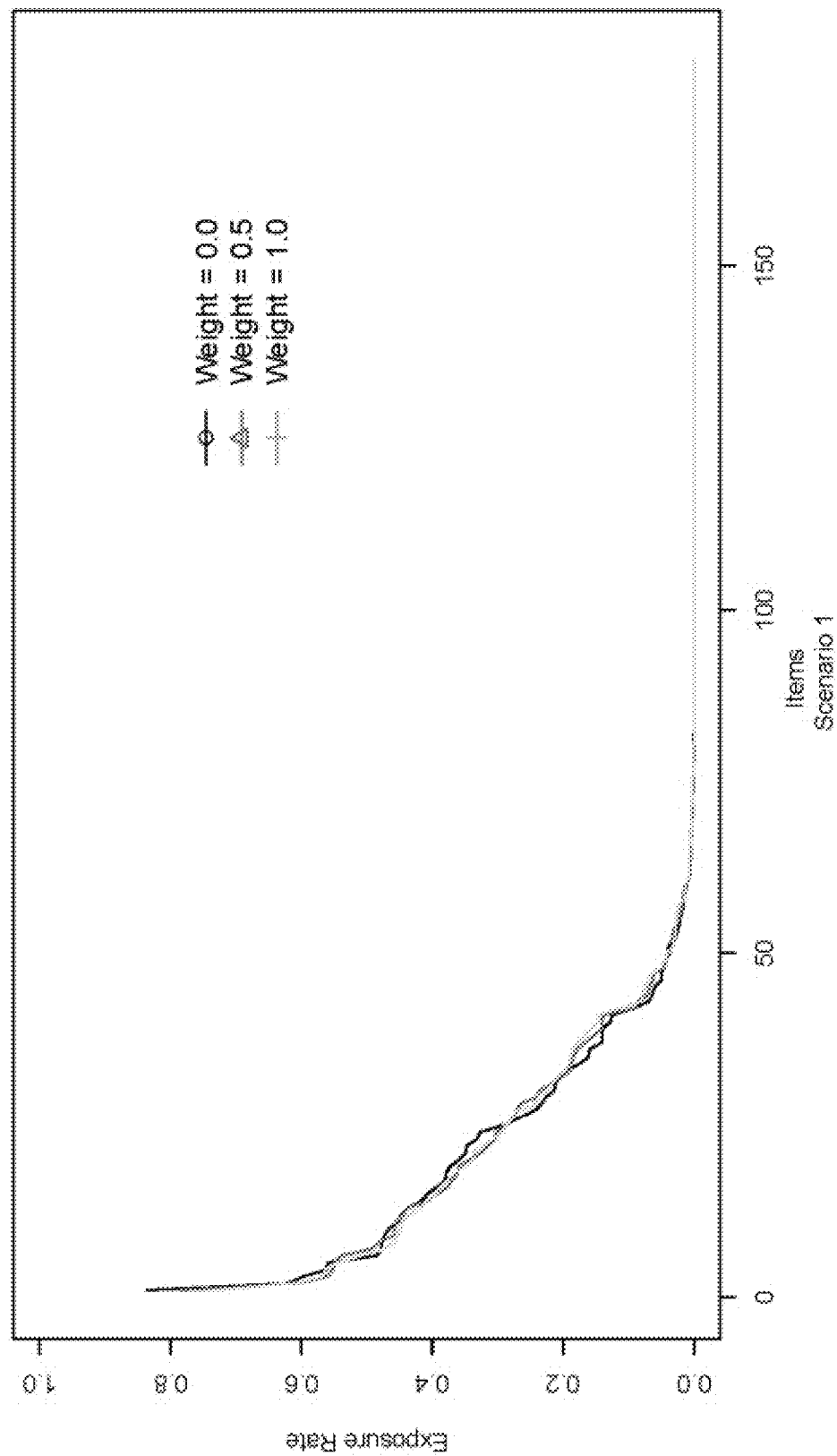
FIGS. 5(A-D) are pictorial representations in plot form for the exposure rates of operational items of each simulation in accordance with an illustrative embodiment.
Figure 5B:
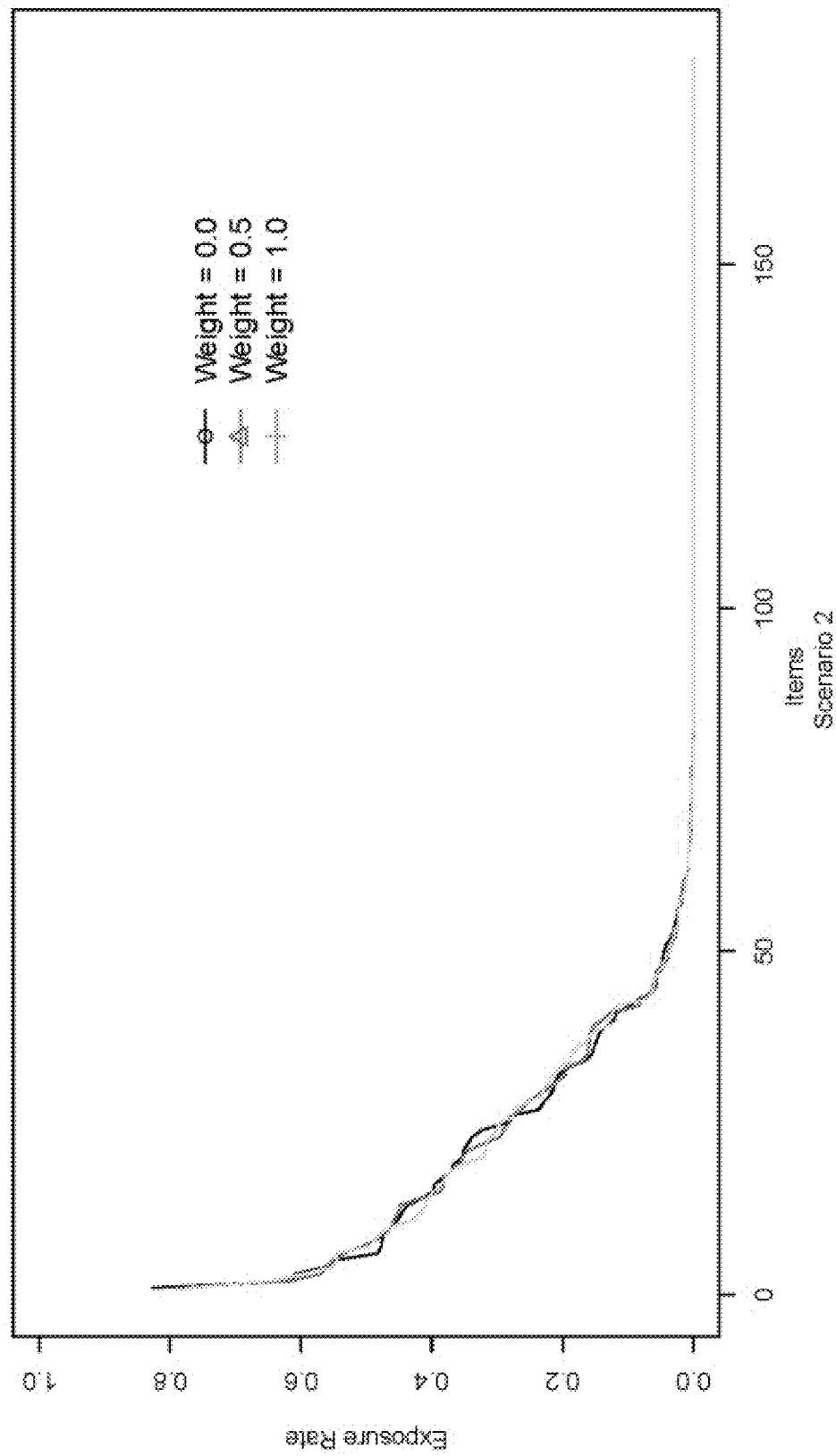
Figure 5C:
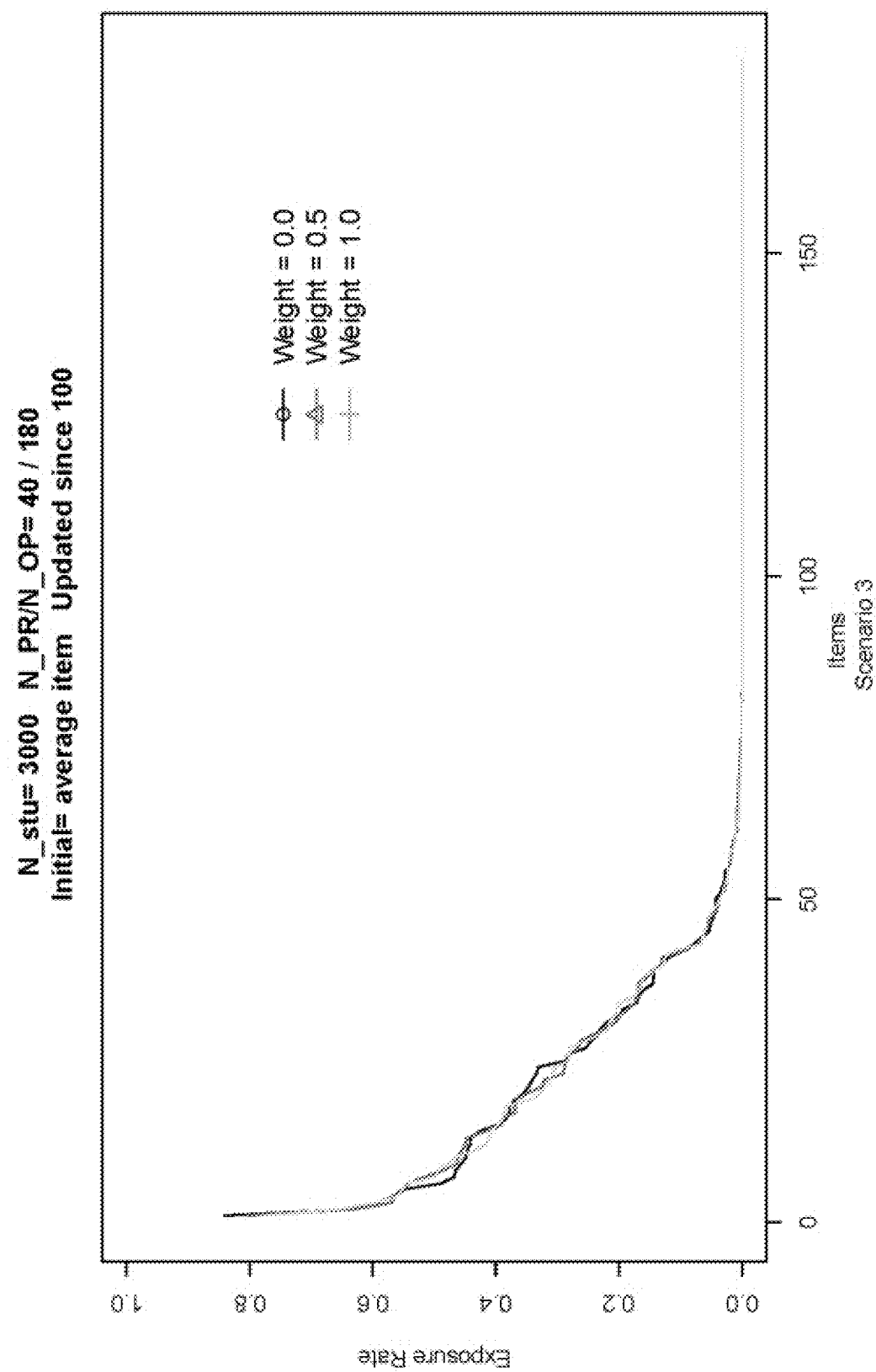
Figure 5D:
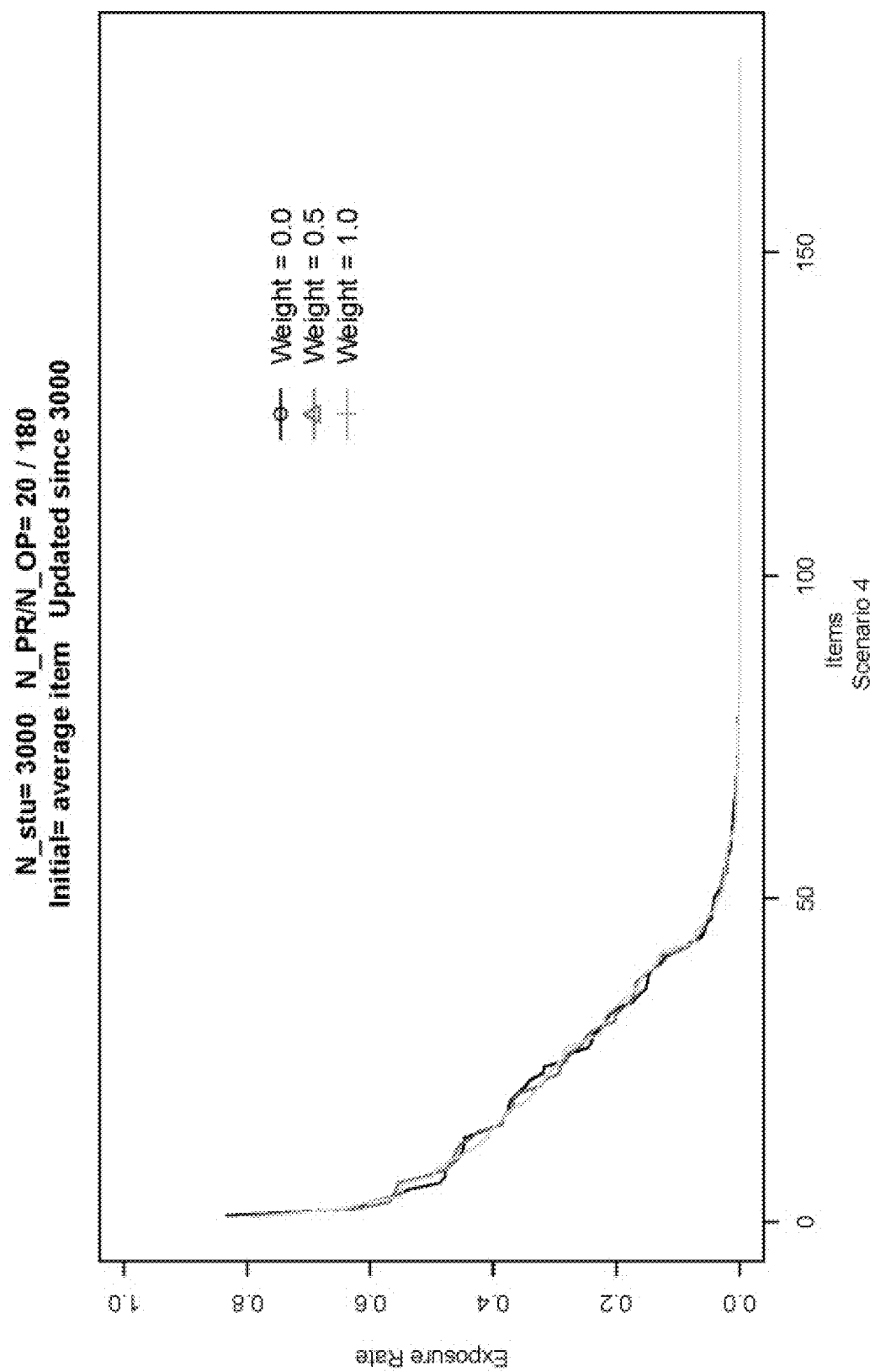

For acquiring an examinee's response information as shown in FIG. 2, a computer adaptive testing platform is provided as illustrated in FIG. 1. The examining interface piece shown in FIG. 2 may be a computer or computer network. Examples of a computer adaptive testing platform shown in FIG. 1 may be a computer network that includes, for example, a server, workstation, scanner, printer, a datastore, and other connected networks. The computer networks may be configured to provide a communication path for each device of the computer network to communicate with other devices. Additionally, the computer network may be the internet, a public switchable telephone network, a local area network, private wide area network, wireless network, or any of the like. In various embodiments of the disclosure, a computer adaptive testing administration script may be executed on the server and/or workstation. For example, in one embodiment of the disclosure, the server may be configured to execute a computer adaptive testing script, provide outputs for displaying to the workstation, and receive inputs from the workstation, such as an examinee's response information. In various other embodiments, the workstation may be configured to execute a computer adaptive testing application individually or co-operatively with one or more workstations. The scanner may be configured to scan textual content and output the content in a computer readable format. Additionally, the printer may be configured to output the content from the computer adaptive test application to a print media, such as paper. Furthermore, data associated with examining response information of the computer adaptive test application or any of the associated processes illustrated or shown in FIGS. 1-2, and any of the like, may be stored on a datastore and displayed on a workstation. The datastore may additionally be configured to receive and/or forward some or all of the stored data. Moreover, in yet another embodiment, some or all of the computer network may be subsumed within a single device. Although FIG. 2 depicts a computer, it is understood that the disclosure is not limited to operation within a computer or computer network, but rather, the disclosure may be practiced in or on any suitable electronic device or platform. Accordingly, the computer illustrated in FIG. 2 or computer network (not shown) are illustrated and discussed for purposes of explaining the disclosure and are not meant to limit the disclosure in any respect.

According to one aspect of the disclosure, an operating protocol is provided on the workstation or computer network for operating a computer adaptive testing module or application. A test made up of a group of pretest item content and operational item content is selected for delivery through a computer adaptive testing module controlled by an operating protocol. In addition to operational item selection and pretest item selection, a test script administration application or process could be implemented to select or establish pretest item parameters for the selected pretest items to be administered by the test script application. Using a computer network, workstation or electronic device, a test is administered using the selected operational and pretest items having one or more selectable pretest item parameters. Using a workstation, computer network, or other electronic device, examinee response information is acquired for the selected operational and pretest items administered as part of the test script administration process or application. Upon acquiring examinee response information for subject pretest items or other operational items as part of a test script being administered, an interim score for an examinee such as a latent construct estimate may be calculated. These calculations could be used to inform subsequent selection of one or more operational items, one or more pretest items, and/or one or more pretest item parameters. Operating on the workstation, network or other electronic device is a latent construct estimator using one or more estimation methods for providing an examinee's interim score, such as a latent construct estimate, or selecting one or more pretest items having selected item parameters. Examples of controlling error during latent construct estimation include weighting the contribution of the pretest items on an examinee's interim latent construct estimates. Other methods include adjusting, calibrating or re-defining pretest item parameters for one or more of the selected pretest items during the administration of the test script administration process or application. A calibration script may also be included and made operable on a computer network, a workstation or like electronic device for calibrating, adjusting or re-defining pretest item parameters based on latent construct estimates. Additionally, the resulting interim scores are more diverse when pretest items are included, thus the following items are more diverse. For example, using such a method, the one or more operational items selected in a test may be reduced to make the test shorter, more accurate, more succinct, and more effective based on the use of pretest items in calculation of interim construct estimates. Thus, including pretest items in interim latent score calculations provides a method to refine a test script administration process or application that uses one or more pretest items in combination with one or more operational items for a testing sequence or event using computer adaptive testing.

The present disclosure provides the use of weighted interim score calculation to control the error impact when pretest items are included in calculating the interim score as well as the final score.

Suppose item j is the jth item administered to an examinee i with true ability $\theta_i$. Let us denote $\hat{\theta}_{i,j}$ as the unweighted interim score using operational items only, and $\hat{\theta}_{i,j}'$ as the unweighted interim score using both the operational and pretest items that have been administered so far. The weighted interim score $\hat{\theta}_{i,j}^*$ is defined as $$\hat{\theta}_{i,j}^* = (1-\omega)*\hat{\theta}_{i,j} + \omega*\hat{\theta}_{i,j}', (0 \leq \omega \leq 1), \quad (1)$$

where $\omega$ is the predetermined weight that is used to control the contribution of pretest items in scoring. The temporarily estimated pretest item parameters can be used along with the already-calibrated parameters of the operational items. Then the weighted interim score can be used for selection of the next item.

b. Illustrative Methods for Using Pretest Items to Fine-Tune an Examinee's Interim Score Many variables can determine the effectiveness of using information contained in the responses to pretest items. In the present disclosure, four scenarios are identified for demonstration. Various values for the weight $\omega$ (0, 0.5, and 1) for pretest items can be explored in a simulated CAT environment.

1) Scenario 1 represents a (best case) scenario/embodiment that demonstrated the upper bound of gain when pretest items are included in interim score estimation. Pretest item parameters are assumed to be known and equal to their true values. These parameters are not updated during the test administration process. Using true pretest item parameters eliminated the impact of error on item parameter estimation. Hence, the final comparisons were among the weights only.

2) Scenario 2 represents another (realistic) scenario/embodiment. The pretest item parameters are initially set to be the average of all the operational item parameters. The pretest item parameters can be updated after being exposed to a certain number of students. Specifically, after a pretest item is exposed to 100 examinees, its parameters can be updated consecutively at every 5th additional exposure.

3) Scenario 3 is yet another (realistic) scenario/embodiment, which is akin to scenario 2, but the number of pretest items is doubled. Because of larger number of pretest items, the speed of updating the item parameters is slower. It can be expected that the pretest item parameters can have larger errors than those from scenario 2 with the same number of examinees.

4) Scenario 4 represents still another (worst case) scenario/embodiment that demonstrates the lower bound of gain when pretest items are included in the interim score estimation. In this scenario, the initial pretest item parameters were set to be the average of all the operational item parameters, and never updated.

c. Illustrative Data for Using Pretest Items to Fine-Tune an Examinee's Interim Score An item pool can be simulated that includes 180 operational items and 20 pretest items. For each examinee, the test consists of 30 items with 15 pretest items embedded in odd number positions. That is, for example, the $1^{st}$, $3^{rd}$, ..., and $29^{th}$ items administered to an examinee are pretest items. All the item parameters are randomly generated, closely following the distributions of those in a real CAT test: a~Lognormal (−0.29, 0.36), b~Normal (0,1), and c~Uniform (0.15, 0.20).

The true abilities of the simulees (N=3,000) can be generated, for example, from a standard normal distribution, truncated at −4 and 4 to eliminate extreme values. The operational items were selected using the Maximum Fisher Information method based on the simulee's weighted interim score $\hat{\theta}_{i,j}^*$ defined in equation (1). The pretest items can be randomly selected and administered. To get a stable interim score at an early stage in a CAT, the interim scores prior to the 6th item can use random numbers between −4 and 4. The three-parameter logistic item response theory (3-PL IRT) model can be used for generating the responses.

d. Illustrative Calibrations for Using Pretest Items to Fine-Tune an Examinee's Interim Score The estimated pretest item parameters can be the maximum likelihood (ML) estimators based on the examinee's responses, assuming the values of the examinees' abilities are known and equal to their ability estimates obtained so far. Given that the examinees' abilities are fixed, Lord's (1980) maximization procedure can be used to obtain the ML estimator of item parameters. This estimation approach is also documented by Stocking (1988) and sometimes referred to as Stocking's Method A. In cases where a ML estimator cannot be obtained due to small number of responses, the item parameters can retain their current values until they are ready to be updated.

The simulation can be carried out using software R (R Core Team, 2013). Specifically, the following R packages can be used: irtoys (Partchev, 2012), reshape (Wickham, 2007), matrixStats (Bengtson, 2013), and truncnorm (Trautmann, Steuer, Mersmann, & Bornkamp, 2012).

e. Illustrative Criteria for Using Pretest Items to Fine-Tune an Examinee's Interim Score The efficiency of the weighted interim score can be evaluated based on the recovery of examinee thetas. The final estimated scores can be compared against the true abilities using, for example, the following criteria: mean error (ME) and root mean squared error (RMSE). ME is an estimator of bias, and RMSE is an estimator of the recovery accuracy.

$$ME(\hat{\theta}) = \frac{1}{N}\sum_{i=1}^{N}(\hat{\theta}_i - \theta_i) \quad (2)$$

$$RMSE(\hat{\theta}) = \sqrt{\frac{1}{N}\sum_{i=1}^{N}(\hat{\theta}_i - \theta_i)^2} \quad (3)$$

Including pretest items in the scoring changes the interim scores for the examinees. A different interim score affects the selection of the next item. The usage of the operational items can be examined to see if the new approach changes the usage pattern of operational items.

f. Illustrative Results and Conclusions for Using Pretest Items to Fine-Tune an Examinee's Interim Score The mean error (ME) of each simulation is presented in FIGS. 3(A-D). The root mean squared error (RMSE) is displayed in FIGS. 4(A-D).

As shown in FIGS. 3(A-D) and 4(A-D), for all scenarios, the measurement efficiency in terms of RMSE improved when the pretest items are included in scoring. Further, more information can be extracted from the examinees' responses to the pretest items with the increasing weights. When the full weight (i.e., ω=1) is used, the pretest items contributed most to the improved measurement accuracy.

In one exemplary (best case) scenario/embodiment where the pretest item parameters are known, FIGS. 4(A-D) demonstrate how much gain can be achieved with this approach. Since the estimated item parameters can be expected to be get closer to the true parameters as the exposure increases, the performance of the weighted interim scores approach gets closer to the (best case) scenario/embodiment as the number of examinees increases.

The exposure rates of operational items are shown in FIGS. 5(A-D). From FIGS. 5(A-D) one can see that using pretest item in interim scoring eases the pressure on the most frequently selected items. And, more operational items in the pool are administered at least once in the simulation.

In a computer adaptive test (CAT), pretest items may be imbedded in the test but may not necessarily be intended to make a contribution to the estimation of an examinee's latent construct. The type of latent construct addressed here is one variable generally not measurable directly so that the variable is captured through questions representing the presence or level of the variable in question. Given the valuable information that is contained in an examinee's responses to pretest items, which then can be used for latent construct estimation, what follows are illustrative aspects according to embodiments of the disclosure for administering, controlling, calibrating, and capturing latent construct information resulting from pretest item administration for increasing the accuracy, succinctness for a test and thereby resulting in a shorter, more accurate and effective test. Collective estimations understand the obstacles arrived at for counting pretest items in latent construct estimations. For example, item parameters for pretest items may not be fully vetted and/or calibrated when pretest items are administered. Methods of the present application, according to illustrative examples, take into account that pretest item parameters could be estimated, so to speak, on-the-fly and updated subsequent to, such as immediately following, exposure to a new examinee. In this instance, the response sample size is smaller than what might be standard practice for calibration purposes. Furthermore, smaller sample sizes could lead to larger error in the estimated item parameters. The uncertainty of the item parameters of pretest items deters many and offers a disincentive to including them in latent construct calculations.

II. Other Embodiments and Variations

The present disclosure is not to be limited to the particular embodiments described herein. In particular, the present disclosure contemplates numerous variations in the type of ways in which embodiments of the disclosure may be applied to computer adaptive testing. The foregoing description has been presented for purposes of illustration and description. It is not intended to be an exhaustive list or limit any of the disclosure to the precise forms disclosed. It is contemplated that other alternatives or exemplary aspects that are considered are included in the disclosure. The description is merely examples of embodiments, processes or methods of the disclosure. For example, the methods for controlling waiting for use of pretest items in latent construct estimation may be varied according to use and test setting, test type, and other like parameters. It is understood that any other modifications, substitutions, and/or additions may be made, which are within the intended spirit and scope of the disclosure. For the foregoing, it can be seen that the disclosure accomplishes at least all of the intended objectives.

What is claimed is:

1. A method for using pretest items in a computer adaptive testing platform to calculate interim scores while administering a computer implemented test through a graphical user interface, the method comprising:

determining a first computer implemented test from a test script administration component, the computer implemented test having a first plurality of test items including:
   an operational item; and
   a pretest item having one or more pretest items parameters, wherein the one or more pretest item parameters include statistical pretest item response data acquired from other examinees;

calculating, with a latent construct estimator, a first interim score based on the response data acquired from other examinees to the operational item and the pretest item;

determining a second computer implemented test having a second plurality of test items, wherein the second computer implemented test comprises a second pretest item and a second operational item, and
   wherein the second operational item is chosen based on the first interim score;

displaying, on the graphical user interface, the second computer implemented test;

obtaining, from the graphical user interface, second responses to the second operational item and the second pretest item;

calculating, with the latent construct estimator, a second interim score based on the second responses to the operational item, wherein the calculation of the second interim score includes applying a weight to one or more contributions of the one or more pretest items, and
   wherein the second interim score is calculated by:

$$\hat{\theta}_{i,j}^* = (1-\omega)*\hat{\theta}_{i,j} + \omega*\hat{\theta}_{i,j}', (0<\omega<1),$$

where w is the weight applied to the second pretest item, j is a test item administered to the current examinee i with true ability $\hat{\theta}_i$, $\hat{\theta}_{i,j}$ is an unweighted interim score using operational items only, and $\hat{\theta}'_{i,j}$ is an unweighted interim score using both the operational and pretest items administered so far;
and refining the test script administration component to select a particular test item based on the second interim score.

2. The method of claim 1 further comprising:
estimating the one or more pretest item parameters for use with a set of calibrated parameters for the operational item.

3. The method of claim 1 wherein the one or more pretest item parameters are:
equal to the one or more pretest item parameters true value(s); and
not updated during administration of the computer implemented test.

4. The method of claim 1 further comprising:
setting the one or more pretest item parameters to an average of a set of calibrated parameters for the operational item.

5. The method of claim 4 further comprising:
updating the one or more pretest item parameters based on corresponding pretest item responses from a threshold number of additional examinees.

6. The method of claim 1 wherein the one or more pretest item parameters comprise maximum likelihood estimators based on the second responses.

7. A method for use of pretest items in a test to calculate interim scores comprising:
providing a computer implemented test, generated with a computer adaptive testing component, having a plurality of test items including:
an operational item; and
a pretest item having one or more pretest item parameters, wherein the one or more pretest item parameters include statistical pretest item response data acquired from other examinees;
calculating, with a latent construct estimator, a first interim score based on the response data acquired from other examinees to the operational item and the pretest item;
determining a second computer implemented test having a second plurality of test items, wherein the second computer implemented test comprises a second pretest item and a second operational item, and
wherein the second operational item is chosen based on the first interim score;
displaying, on a graphical user interface, the second computer implemented test;
obtaining, from the graphical user interface, second responses to the operational items and the second pretest item;
calculating, with the latent construct estimator, a second interim score based on the second responses to the operational item, wherein the calculation of the second interim score includes applying a weight to one or more contributions of the one or more pretest items, and wherein the second interim score is calculated by:

$$\hat{\theta}_{i,j}^* = (1-\omega)*\hat{\theta}_{i,j} + \omega*\hat{\theta}_{i,j}', (0<\omega<1),$$

where w is the weight applied to the second pretest item, j is a test item administered to the current examinee i with true ability $\hat{\theta}_i$, $\hat{\theta}_{i,j}$ is an unweighted interim score using operational items only, and $\hat{\theta}'_{i,j}$ is an unweighted interim score using both the operational and pretest items administered so far;
determining a particular test item based on the second interim score; and obtaining, from the graphical user interface, an examinee response to the particular test item.

8. The method of claim 7 further comprising:
randomly selecting and administering the pretest item.

9. The method of claim 7 further comprising:
updating the second interim score for the computer implemented test based on the second responses to the second pretest item.

10. The method of claim 1, wherein the pretest item parameters are not updated during administration of the computer implemented test.

11. The method of claim 1, wherein the pretest item parameters are initially equal to an average of operational item parameters.

12. A computer adaptive testing (CAT) platform to calculate interim scores while administering a computer implemented test through a graphical user interface, the CAT platform comprising a computer configured to:
determine a first computer implemented test from a test script administration component, the computer implemented test having a first plurality of test items including:
an operational item; and
a pretest item having one or more pretest items parameters, wherein the pretest item parameters include statistical pretest item response data acquired from other examinees;
calculate, with a latent construct estimator of the computer, a first interim score based on the response data acquired from other examinees to the operational item and the pretest item;
determine a second computer implemented test having a second plurality of test items, wherein the second computer implemented test comprises a second pretest item and a second operational item, and
wherein the second operational item is chosen based on the first interim score;
display, on the graphical user interface, the second computer implemented test;
obtain, from the graphical user interface, second responses to the second operational item and the second pretest item;
calculate, with the latent construct estimator of the computer, a second interim score based on the second responses to the operational item, wherein the calculation of the second interim score includes applying a weight to one or more contributions of the one or more pretest items, and wherein the second interim score is calculated by:

$$\hat{\theta}_{i,j}^* = (1-\omega)*\hat{\theta}_{i,j} + \omega*\hat{\theta}_{i,j}', (0<\omega<1),$$

where w is the weight applied to the second pretest item, j is a test item administered to the current examinee i with true ability $\hat{\theta}_i$, $\hat{\theta}_{i,j}$ is an unweighted interim score using operational items only, and $\hat{\theta}'_{i,j}$ is an unweighted interim score using both the operational and pretest items administered so far; and
refine the test script administration component to select a particular test item based on the second interim score.

* * * * *